United States Patent [19]

Faubion

[11] Patent Number: 4,676,608

[45] Date of Patent: Jun. 30, 1987

[54] MEASURING MICROSCOPE ASSEMBLY

[76] Inventor: Donald Faubion, 5102 Gallant Fox Ave., San Jose, Calif. 95111

[21] Appl. No.: 735,679

[22] Filed: May 20, 1985

[51] Int. Cl.[4] ............................................. G02B 21/24
[52] U.S. Cl. ..................................................... 350/521
[58] Field of Search ................ 350/521, 530; 108/147; 248/405

[56] References Cited

U.S. PATENT DOCUMENTS

| | | | |
|---|---|---|---|
| 678,642 | 7/1901 | Chambers | 248/405 |
| 1,106,956 | 8/1914 | Meyer | 350/521 |
| 1,968,094 | 7/1934 | Ott | 350/521 |
| 2,000,737 | 5/1935 | Bauersfeld | 350/521 |
| 2,148,576 | 2/1939 | Ott | 350/521 |
| 2,360,268 | 10/1944 | Ott | 350/521 |
| 2,508,738 | 5/1950 | Aitcheson | 350/521 |
| 3,442,593 | 5/1969 | Marcovecchio et al. | 74/424.8 R |
| 3,508,835 | 4/1970 | Ware | 350/521 |
| 3,895,770 | 7/1975 | Yoshida et al. | 350/530 |

FOREIGN PATENT DOCUMENTS

| | | | |
|---|---|---|---|
| 369595 | 2/1923 | Fed. Rep. of Germany | 350/521 |
| 2262614 | 7/1974 | Fed. Rep. of Germany | 350/530 |

*Primary Examiner*—William H. Punter
*Attorney, Agent, or Firm*—Flehr, Hohbach, Test, Albritton & Herbert

[57] ABSTRACT

A measuring microscope includes coarse and fine focusing controls arranged in a manner to isolate the microscope from any lateral forces caused by manual manipulation of the controls so as to remain precisely on the same Z axis during and after fine focusing.

5 Claims, 2 Drawing Figures

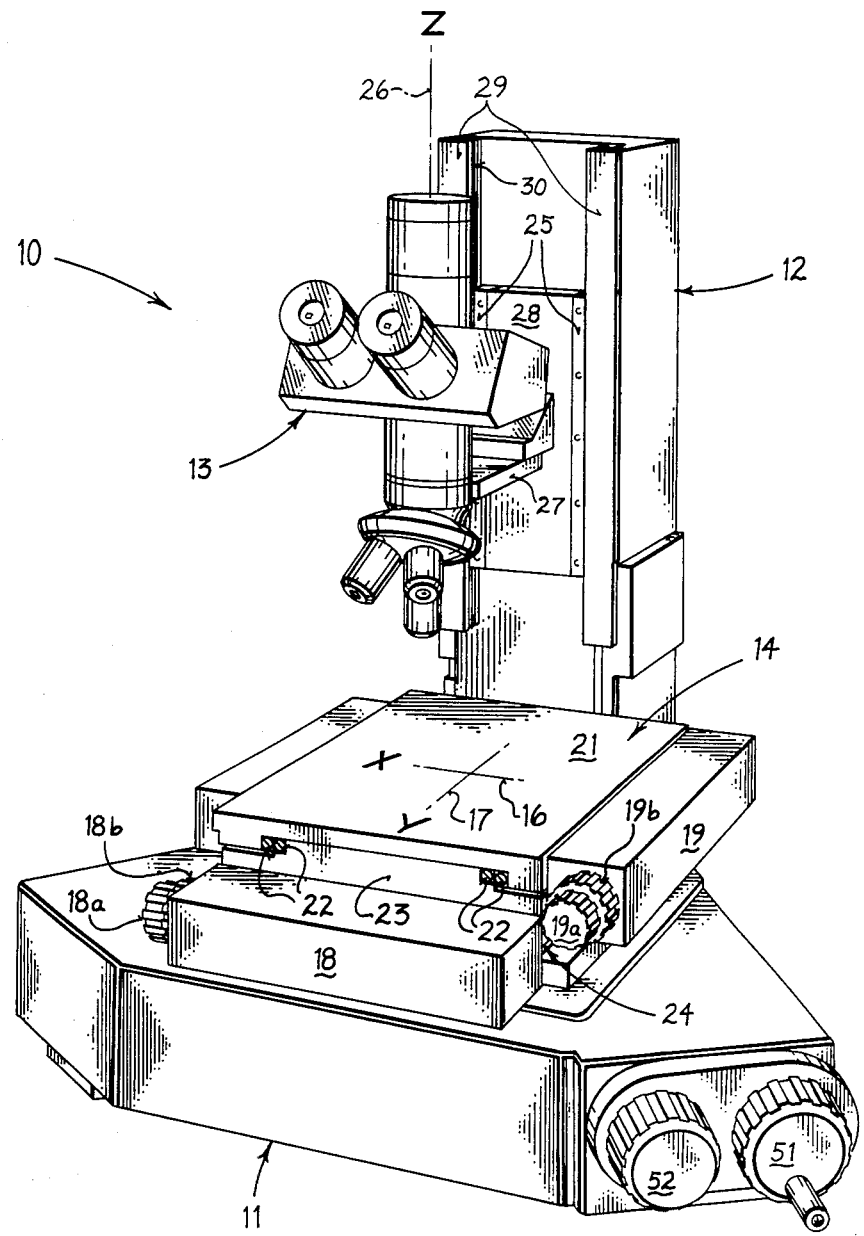
FIG_1

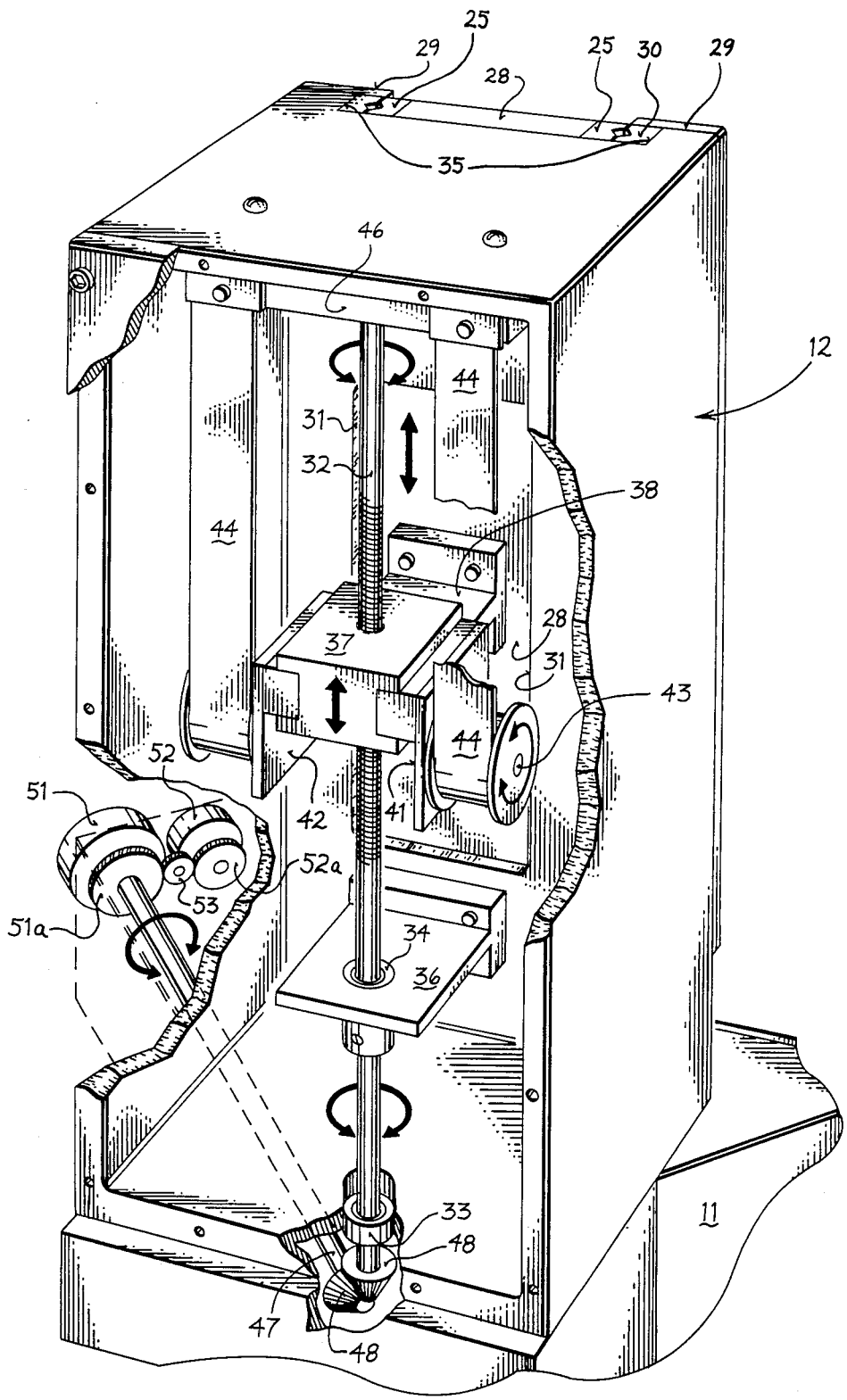
FIG_2

MEASURING MICROSCOPE ASSEMBLY

This invention relates to improvements in measuring microscopes and more particularly to improvements for controlling the focusing of same.

Measuring microscopes presently available provide measurements in terms of millionths of an inch. Such fine measurements are achieved by using 1,000×, 2,000× magnification. Beneath the Z (or vertical) axis of the optical unit, a stage or positioning table supports a specimen to be positioned by movement of the stage in a horizontal plane along X and Y axes. Micrometer means, linear scales with encoders or the like associated with the stage serve to detect movement to a resolution down to five millionths of an inch. (The Z axis can also be fitted with indicators and/or encoders as desired for detecting its movements.)

Microscope support columns are typically made from cast iron, aluminum, etc., and the "Z" axis is disposed precisely perpendicular to the horizontal plane of the stage using fitted ways and either solid or pre-loaded bearings cooperating with the ways to maintain alignment.

Focusing of the microscope typically involves a coarse vertical movement to a position approximately in focus followed by manipulation of a knob or element for purposes of finely focusing the object or specimen. In many instances this knob or element for providing fine focusing of the microscope has been mounted on the support column of the microscope, or on the microscope itself. It has been observed that even though these support columns are relatively strong in nature, the slightest amount of lateral hand pressure applied to the support column can cause the microscope cross hairs to move off line in terms of millionths of an inch thereby providing a false measurement. When the person's hand is removed from the fine focusing knob, the column will spring back to mis-align the cross hairs of the microscope to the position actually measured. Thus, the actual measurement will be in error due to the lateral pressure on the column during fine focusing. This error, of course, requires the operator to repeat the focusing and measurement manipulations and leads to operator fatigue and aggravation.

In addition to the above, the means for finely focusing the microscope has frequently relied on the use of a cam or other similar device to introduce the final adjustment to the microscope movement for "fine focusing". Movement of the support column to achieve fine focusing in this manner is necessarily limited to a relatively short range. Thus, if the coarse movement of the optical unit does not bring the specimen into focus before the fine focus control bottoms out, the operator must wind the fine focus control back to its center of travel, reposition the coarse focusing control, and try again. This procedure is experienced repeatedly in the operation of equipment of the kind noted.

As disclosed herein means for achieving fine focusing of the optical unit permits continuous movement of the optics throughout the full range of travel of the support column along the Z axis, i.e., between the extremes of travel of the microscope.

In addition to the above, measuring microscopes have typically had a coarse drive located at one position on the apparatus and a fine adjustment located at a different location substantially displaced from the first. Accordingly, manipulation of equipment of this type causes substantial fatigue which has become a common complaint among operators using equipment of this kind. The problem becomes greater as the stages employed in measuring microscopes have increased in size. Thus, disposing the separated coarse and fine adjustment knobs (carried respectively on the support column and on the microscope) farther and farther away from the operator, causes increased reaching to operate the focusing controls.

As disclosed herein the mechanism for controlling focusing of the microscope can be located at any distance from the column and both coarse and fine adjustments are made from substantially the same remote location near the operator. Further, by so disposing the focusing mechanism, the microscope will not be influenced by any lateral forces during focusing.

In general, for a measuring microscope assembly of a type having a base, a microscope, and a support column carried by the base for supporting the microscope to move between raised and lowered positions as well as means for supporting a specimen beneath the microscope to be examined, there has been provided traveling means carried by the column for moving the microscope between the extremes of travel thereof. Means carried by the base and located remote from the column serve to selectively move the traveling means and the microscope at a first or second rate throughout the full range of travel of the microscope to provide a coarse or fine movement of the microscope over the full range free of forces acting laterally against the column.

In general it is an object of the present invention to provide an improved measuring microscope assembly.

It is another object of the present invention to provide a measuring microscope assembly wherein both the coarse and fine focusing movements function throughout the full range of travel of the microscope along its Z axis.

Yet another object of the invention is to provide a measuring microscope assembly characterized by means for focusing same in a manner which is "non-influencing", i.e., in a manner which does not influence the accuracy of the measuring microscope.

Yet another object of the invention is to provide a measuring microscope assembly characterized by means acting to counteract some of the weight raised and lowered by the coarse/fine positioning mechanism.

The foregoing and other objects of the invention will become more readily evident from the following detailed description of a preferred embodiment when considered in conjunction with the drawings.

BRIEF DESCRIPTION OF THE DRAWINGS

FIG. 1 shows a diagrammatic perspective view of the measuring microscope assembly according to the invention as viewed from the front; and FIG. 2 shows an enlarged diagrammatic perspective view of the back of a measuring microscope assembly as shown in FIG. 1 with portions removed or brokwn away for clarity.

DETAILED DESCRIPTION OF PREFERRED EMBODIMENT

A measuring microscope assembly 10 includes a relatively heavy base 11 to provide a steady support. A rigid support column 12 extends upwardly from the rear portion of base 11 for carrying a microscope unit 13 to be positioned above base 11.

Base 11 further supports a positioning table 14 adapted to carry a specimen to be measured or otherwise examined.

Means for positioning table 14 along X and Y axes 16, 17 includes an X axis drive assembly 18 and a Y axis drive assembly 19 of known design. The positioning table assembly 14 includes a stage or platform 21 of known design mounted to ride on linear bearings (not shown) carried by ways. The ends 22 of the ways are shown in FIG. 1 with respect to movement of platform 21 along the Y axis 17.

An intermediate panel 23 includes on its underside similar guide ways and bearings extending perpendicular to those on its upper surface. Accordingly, the ways (not shown) beneath panel 23 extend in the direction of X axis 16. Thus, a specimen disposed upon the surface of table 14 can be moved along the Y axis 17 by sliding platform 21 with respect to the intermediate panel 23. Also, the specimen can be moved sideways along the X axis 16 by jointly moving both intermediate panel 23 and stage 21 with respect to the base guide plate 24. Each drive assembly 18, 19 includes a pair of rotatable knobs such as 19a, 19b and 18a, 18b.

Drive assemblies 18, 19 are of known design whereby assembly 18 can be fixed to base 11. Thus, by rotation of one or the other of knobs 18a, 18b a connection, not shown, extending into intermediate panel 23 will move panel 23 in the direction of X axis 16. Similarly, drive assembly 19 is arranged to be fixed to the intermediate panel with a connecting drive or the like engaging platform 21 to cause it to move along Y axis 17 in response to rotation of one or the other of the two knobs 19a, 19b. Typically, the larger knobs 18b, 19b serve to provide a coarse drive to the movement of stage 21 while the smaller knobs 18a, 19a serve to provide the fine movement so that the positioning of a specimen carried on positioning table 14 can be accurately disposed with respect to microscope unit 13.

Support column 12 serves to carry microscope unit 13 for vertical movement along the Z axis 26 to permit unit 13 to be positioned with respect to platform 21. Thus, a Z axis slide 28 carries a microscope mounting bracket 27.

Pre-loaded crossed roller linear bearings of known design captured between hardened guide rails 25 carried by the side edges of slide 28 and guide rails 30 secured to the confronting sides of a mounting slot 35 provide a smooth and accurate vertical movement of the Z axis slide 28. Protective flanges 29 carried on the front of column 12 tend to keep the bearings free of dirt.

Slide 28 covers a rectangular opening 31 formed in the front wall of column 12. Means for focusing microscope unit 13 with respect to a specimen carried on positioning table 14 includes a vertically oriented lead screw 32, journaled in bearings 33, 34 carried respectively in the bottom of column 12 and in a journal plate 36 mounted to the front wall of column 12 beneath opening 31. Lead screw 32 carries a traveling nut 37 threaded thereto to move between raised and lowered positions relative to the plane of positioning table 14.

A bracket 38 secured to the back side of the Z axis slide 28 interconnects with nut 37 whereby movement of nut 37 along lead screw 32 serves to move microscope unit 13 between raised and lowered positions.

Means serving to counteract some of the weight of microscope unit 13, slide 28 and nut 37 which must be raised and lowered by lead screw 32 serves to reduce the force required to rotate lead screw 32 as now to be described.

Mounting panels 41, 42 are respectively secured to the sides of nut 37 and each carries a pivot pin 43 extending outwardly to the side thereof. Pivot pins 43 each support a coiled constant force spring 44, such as a neg-a-tor spring.

By anchoring the outer (free) end of each spring 44 to a mounting bracket 46, springs 44 will unwind as nut 37 travels downwardly along lead screw 32 and will rewind as nut 37 moves upwardly As is known, the force which will be applied via springs 44 will remain substantially constant throughout the travel of nut 37. This force will, however, serve to assist in lifting and lowering the weight of microscope unit 13, etc., during operation to relieve fatigue for the operator.

Means for rotating lead screw 32 to raise and lower microscope unit 13 includes a rotatable transmission shaft 47 coupled by means of a pair of bevel gears 48 so as to rotate screw 32.

Lead screw 32 and shaft 47 can be operated selectively at a first or second rate in order to provide a coarse or fine movement to microscope unit 13. Thus, controls in the form of knobs or spools 51, 52 carried on the front of base 11 are each associated with gears 51a, 52a. Gear 51a is somewhat larger than gear 52a and the two are geared together by means of a reduction gear 53.

Shaft 47, being directly coupled to spool 51, rotates at the rate of rotation of spool 51 and accordingly provides a coarse driving of lead screw 32. Rotation of spool 52, however, being coupled by the reduction gear 53 to gear 51a, serves to rotate shaft 47 at a reduced rate with respect to the rate of rotation of spool 52. Accordingly, a fine positioning of the microscope unit 13 can be achieved by use of spool 52 throughout the full range of travel of nut 37 along the Z axis. Other geared arrangements may be used for accomplishing the above objective.

As shown in FIG. 1, it will be readily evident that both the coarse and fine drives represented by spools 51, 52 will be conveniently located together and directly in front of the operator of the unit. Accordingly, reaching from one control to another over any substantial distance has been eliminated as well as any lateral influence which might be applied to microscope unit 13 or support column 12 during focusing.

Accordingly, it will be readily evident that there has been provided an improved measuring microscope assembly.

What is claimed is:

1. In a measuring microscope assembly having means forming a relatively heavy base, a microscope, a support column for carrying said microscope to be positioned above said base, a positioning table supported by said base serving to carry a specimen to be examined, means for positioning said table along X and Y axes to align the specimen with respect to the microscope, means for focusing the microscope with respect to the specimen comprising traveling means carried by the column to move between raised and lowered positions relative to the plane of the table, means coupling said microscope to said traveling means for moving the microscope between raised and lowered positions relative to the specimen in response to movement of said travelling means, a lead screw carried by said support column, a portion of said traveling means being threaded onto said lead screw for raising or lowering the microscope in response to rotation of said lead screw, a rotatable transmission shaft coupled to rotate said lead screw, and means carried at the front of said base and continuously coupled to rotate said shaft at a first or second rate for driving said lead screw selectively at a first or second rate respectively providing coarse and fine movements to the microscope, said lead screw remaining continuously free for rotation by said shaft.

2. In a measuring microscope assembly according to claim 1 wherein the last-named said means comprises a gear carried by said shaft to rotate said shaft, and first and second gears operated by associated knobs and disposed to engage the first named said gear, said knobs and associated gears being first and second means for selectively rotating said shaft.

3. In a measuring microscope assembly according to claim 1 wherein the last-named said means comprises a first and second rotatable spool, said first spool being coupled to directly drive said shaft, said second spool being geared to said first spool via a reduction gear to permit the rotation of said second spool to rotate said shaft at a lesser rate than that of said first spool thereby rotating said lead screw at different rates.

4. In a measuring microscope assembly having means forming a relatively heavy base, a microscope, a support column for carrying said microscope to be positioned above said base, a positioning table supported by said base serving to carry a specimen to be examined, means for positioning said table along X and Y axes to align the specimen with respect to the microscope, means for focusing the microscope with respect to the specimen comprising traveling means carried by the column to move between raised and lowered positions relative to the plane of the table, means coupling said microscope to said traveling means for moving the microscope between raised and lowered positions relative to the specimen in response to movement of said travelling means, a lead screw carried by said support column in a manner to be continuously free to be rotated, a portion of said traveling means being threaded onto said lead screw for raising or lowering the microscope in response to rotation of said lead screw, a drive shaft coupled to drive said screw, and means carried at the front of the base for rotating said drive shaft for driving said lead screw selectively at a first or second rate to provide a coarse or fine movement to the microscope.

5. In a measuring microscope assembly comprising a base, a microscope, a support column carried by said base for supporting said microscope to move between raised and lowered positions, means for supporting a specimen beneath said microscope to be examined, traveling means carried by said column for moving said microscope between the extremes of travel thereof, a lead screw carried by said support column in a manner to be continuously free to be rotated, a portion of said traveling means being threaded onto said lead screw for raising and lowering the microscope between said extremes of travel thereof in response to rotation of said lead screw, a rotatable shaft coupled to rotate said lead screw, and control means coupled to rotate said shaft at both a first and second rate for driving said lead screw selectively at a first or second rate to provide coarse and fine movements respectively to the microscope, said lead secrw remaining continuously free for rotation by said control means, said control means being carried by said base sufficiently remote from said column to permit said column to remain free of forces acting laterally against said column while said control means serve to selectively move said traveling means and said microscope at a first or second rate from either of said extremes of travel to the other to selectively provide either a coarse or fine movement to the microscope over the full range of travel of the microscope between said extremes of travel while remaining free of forces acting laterally against said column in a manner tending to influence the alignment of the microscope with a specimen.

* * * * *